United States Patent
Davis

[15] 3,667,218
[45] June 6, 1972

[54] GAS TURBINE TEMPERATURE ADAPTIVE CONTROL

[72] Inventor: Richard K. Davis, Roanoke, Va.
[73] Assignee: General Electric Company
[22] Filed: Mar. 27, 1970
[21] Appl. No.: 23,372

[52] U.S. Cl. ..................................................60/39.28 T
[51] Int. Cl. ..................................................F02c 9/04
[58] Field of Search..................60/869, 538, 878, 015, 39.28

[56] References Cited

UNITED STATES PATENTS

| | | | |
|---|---|---|---|
| 3,533,236 | 10/1970 | Cottington | 60/39.28 |
| 3,520,133 | 7/1970 | Loft | 60/39.28 |
| 2,971,337 | 2/1961 | Wintrode | 60/243 X |
| 3,082,954 | 3/1963 | Offner | 60/39.28 X |
| 3,240,013 | 3/1966 | Späth | 60/39.28 |
| 3,482,396 | 12/1969 | Nelson | 60/39.28 |

*Primary Examiner*—Carlton R. Croyle
*Assistant Examiner*—Robert E. Garrett
*Attorney*—John B. Sponsler, James C. Davis, Frank L. Neuhauser, Oscar B. Waddell, Joseph B. Forman and Arnold E. Renner

[57] ABSTRACT

A temperature adaptive control system for controlling the rate of fuel flow to a gas turbine having sensors in the path of the exhaust gases which produce an electrical feedback signal proportional to temperature. Another signal, proportional to maximum allowable temperature, normally opposes the feedback signal at a summing junction. A third coacting signal forms an envelope and varies indirectly with the temperature of the turbine over a predetermined period of time at the end of which it is reduced to zero, causing the fuel flow to increase the maximum controlled rate without exceeding the temperature limits defined by the third signal.

5 Claims, 3 Drawing Figures

GAS TURBINE TEMPERATURE ADAPTIVE CONTROL

BACKGROUND OF THE INVENTION

To obtain the greatest efficiency from a gas turbine, it is desirable to operate under conditions wherein the temperature of the gases entering the turbine section is as high as possible, but within design stress limitations of the turbine hot gas parts. A temperature control system is therefore required which will override the speed or the load control of the turbine should the turbine inlet temperature exceed a preset limit. Since it is impractical to measure turbine inlet temperature directly, the temperature control system is designed to control the turbine inlet temperature indirectly, by controlling exhaust temperature. During normal steady state operation of the gas turbine up to 100 percent of turbine speed, exhaust temperature is held at an optimum value by a fuel level control function. During the starting sequence of the turbine, the temperature control is an integral part of the starting function. In the starting sequence when the turbine is fired, the flame detectors initiate a timing period during which the temperature of the turbine is gradually increased to its final running temperature In the prior art the control circuitry which performs this time function includes a motor operated rheostat or hydraulic function which gradually moves through a predetermined number of steps whereby the fuel applied to the turbine is controlled as a function of time by means of a rheostat or hydraulic system or some other mechanical means. The adjustment of the upper and lower limits of fuel level applied to the turbine is generally a mechanical adjustment within the control and usually difficult to perform. The rate at which the temperature is allowed to increase over the time period is generally not actually due to predetermined motor speed in the rheostat, hence is difficult to alter.

CROSS REFERENCE TO RELATED APPLICATIONS

This application is an improvement over a previously filed application for patent, Ser. No. 869,538 filed Oct. 27, 1969, now U.S. Pat. No. 3,601,984 issued Aug. 31, 1971.

SUMMARY OF THE INVENTION

To overcome these problems the present invention provides a control for a gas turbine wherein a feedback signal representing temperature of the turbine is compared with a reference signal, representing maximum allowable temperature, and a third signal which first varies with the temperature of the turbine over a predetermined period of time and then allows the turbine temperature to increase at a predetermined controlled rate by adjustment of its fuel input.

DETAILED DESCRIPTION

Figure 1:
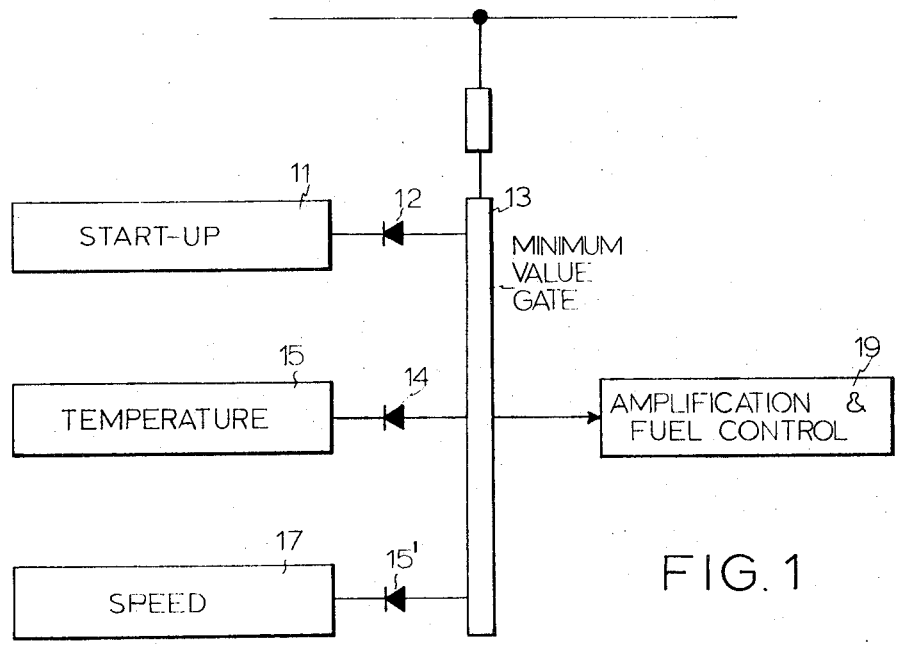
FIG. 1 shows the temperature adaptive control in relation to other functional control used in turbine fuel application.

Refer now to FIG. 1 wherein the control system for running a gas turbine engine has three main parameters of control: (1) start-up, (2) speed and (3) temperature. Into these three parameters may be fed a number of other parameters, such as acceleration, as well as separate input signals as for example the load input on the turbine. The figure is a block diagram showing these three main parameters wherein the start-up control 11 has an output connected to minimum value gate 13 through a diode 12. The temperature control 15 similarly has its output connected to minimum value gate 13 through diode 14; and the speed control 17, which includes acceleration control, has its output connected to minimum value gate 13 through diode 15'. The minimum value gate provides an input signal to amplification and fuel flow control circuitry 19 thereby controlling the fuel quantity applied to the gas turbine (not shown). The initial function of the start-up control is to withhold fuel while the turbine is being "cranked" up to a predetermined firing speed; at that point "A" (FIG. 2) the start-up control provides a signal which initiates the firing of the fuel. Immediately upon detection of the flame, the fuel level input is adjusted downward automatically (Point B) for a warmup period wherein the turbine is gradually brought up to a temperature in order to avoid a thermal shock to the hot gas path parts. At the end of the warmup period, Point "C," the start-up control initiates an accelerate period which causes the fuel control to increase fuel supply to the gas turbine This causes the turbine to increase speed by controlling the allowable temperature increase of the turbine. The rate of temperature increase is that temperature increase per unit length of time which is considered to be safe for the turbine during the periods following the end of the warmup time and maximum allowable temperature level of the turbine. Since the efficiency of the turbine improves with temperature, the speed of the turbine increases more rapidly than the rate of fuel input thereto so that there are times when control of the turbine is directed by the accelerating control which will reduce fuel supply, when excessive acceleration is indicated. The speed of the turbine therefore will increase at the rate allowed by the acceleration control within the limits of the temperature increase rate. When the operating speed has been reached, the speed control assumes responsibility of ruining the turbine. Generally, the turbine is provided with a set of magnetic pick units mounted on the shaft provides a pulse train having a frequency of pulses proportional to the speed of the turbine. An analog voltage signal provides the reference signal against which the magnetic pickup signal is tested. When the reference input cancels the feedback input, in other words, when the resultant of the two signals is zero, the machine is running 100 percent of reference speed.

The third main parameter in the control of a gas turbine is the temperature control, which has the purpose of limiting the start-up fuel input so that operating temperatures of the gas turbine are maintained within safe values, using exhaust temperature as a prime input signal. The temperature control provides an overriding signal such that temperature increase of the exhaust gases may, for example, increase at not more than 5° per second. If fuel input is at a rate which causes the temperature of the exhaust gas to exceed this limit, the temperature control will override all of the other functions of the turbine control and reduce the fuel input to the turbine, thereby restoring the rate of temperature rise to the predetermined level.

Figure 2:
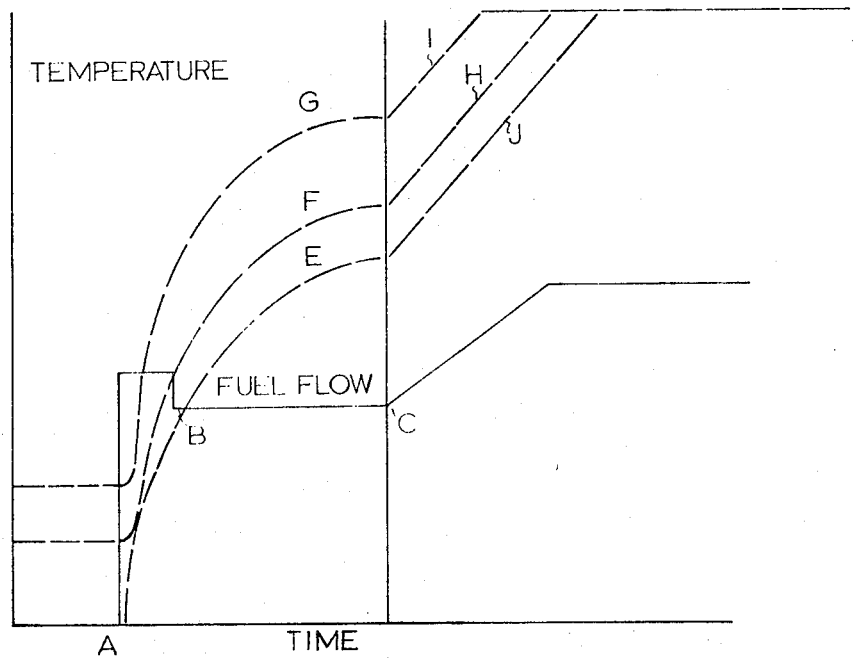
FIG. 2 shows a graph wherein temperature rise and fuel flow are presented as a function of time.

The graph in FIG. 2 shows that during the warmup time while fuel input remains constant the temperature of the turbine increases along one of the three representative curves "E"–"G." The curve which is followed by the temperature of the turbine is dependent on such things as ambient temperature, type of gas used by the turbine or the type of fuel used during starting of the turbine and other reasons which cause variation in temperature rise of the turbine during the start-up phase of the operation. Thus, on a hot day the temperature of the turbine may follow the path represented by curve "G" while on a cold day curve "E" may be more representative. Assume now that curve "F" is representative of an average temperature rise of the turbine during the warmup peroid. The curve terminates after a predetermined time period "C" which initiates an increase of fuel supply at a controlled rate. This results in a turbine speed increase, causing the temperature of the turbine to increase at a rate which parallels the values represented by line "H" of the graph. The slope of line "H" represents the maximum allowable rate of temperature increase for the turbine and is designed to bring the turbine up to speed in a minimum amount of time without exceeding the temperature design limits of the turbine. Prior art teaches the condition where line "H" has a fixed position so that if the turbine temperature during warmup follows curve "E" for example, and additional fuel is applied to the turbine at point "C" the temperature increase is not under control until it intercepts the limits set by line "H". It is therefore quite possible that the rate of temperature increase far exceeds the value represented by the slope of line "H" resulting in endangering the turbine's hot gas parts. A second possibility is that on a hot day the turbine temperature is represented by curve "G" and that when fuel is increased at the end of the warmup periods, point "C" fuel is increased to provide an increase in speed of the turbine. If the temperature limits are again set by the line "H," fuel must be reduced since the curve "G" exceeds the limits set by line "H." This may result in "flaming out" turbine since cutback of fuel after flame detection at point "B" and represented by line "B–C" is the minimum possible fuel flow needed for maintaining flame in the turbine. In the prior art to overcome this, the values represented by line "H" are usually set high enough to accommodate the highest temperatures at the end of the warmup period. This results in increasing problems of the condition first described, since the period where no temperature control is present now extends from the coldest range represented by curve E and the line I representing the limits of temperature of the hottest condition.

The present invention provides a means whereby the temperature control limit is set to accommodate the temperatures existing at the end of the warmup period, for example, if the temperature of the turbine during warmup follows the values represented by curve "F" temperature control during controlled speed-up of the turbine will limit the temperature rate increase to values set by line "H." Similarly if the temperature of the turbine follows the values represented by curve E, the temperature during speed-up will be limited to those represented by line J, and if start-up temperatures are represented by the values shown by curve "G" the speed-up temperatures will be limited to those values represented by line "I."

Figure 3:
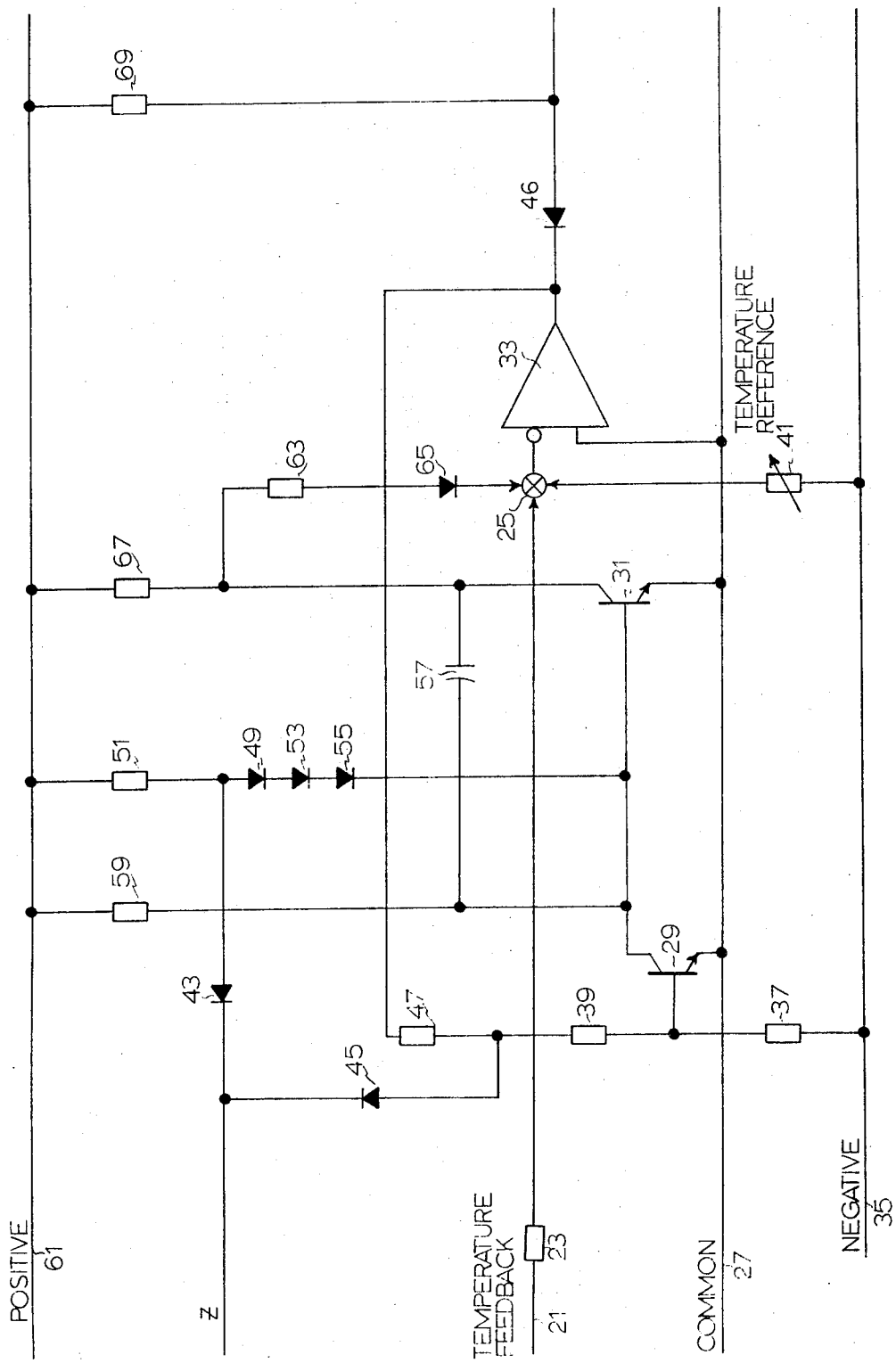
FIG. 3 presents the temperature rate control showing means for suppressing start-up temperature increase rate during start-up of the turbine.

For the electrical circuit required to perform above-described functions, refer now to FIG. 3 wherein a temperature feedback signal 21 is applied through a resistor 23 to a summing junction 25. A common bus 27 is connected to the emitters of transistors 29 and 31 and to the inverse input of operational amplifier 33. A negative bus 35 connects through resistor 37 to the base of transistor 29, and to resistor 39. The negative bus also connects through a variable resistor 41 to summing junction 25. An input connection "Z" (its function will be described later) is connected to the cathodes of diodes 43 and 45. The anode of diode 45 connects to resistor 39 and through resistor 47 to the output of the operational amplifier 33 and the cathode of a diode 46. The anode of diode 43 connects to the anode of diode 49 and to a resistor 51. Diode 49 is connected in series with diodes 53 and 55 to the base of transistor 31 and the collector of transistor 29. The collector of transistor 29 connects to capacitor 57 and through resistor 59 to positive bus 61. The collector of transistor 31 connects to capacitor 57 and through resistor 63 and diode 65 to summing junction 25. The positive bus 61 connects through resistor 67 to capacitor 57 and through resistor 69 to the anode of diode 46. The anode of diode 46 connects to the minimum value gate (FIG. 1.) The minimum value gate provides a means for allowing that circuit, such as the temperature, start-up or speed control, which has the least positive output, to assume control over fuel flow to the turbine.

The operation of the circuit is as follows: The voltage representing the feedback signal ranges from a predetermined positive value representing the highest temperature to a predetermined negative value representing the lowest temperature. Assume, therefore, that the turbine is cold and is ready for start-up. The feedback signal 21 voltage is negative and is applied to the summing junction 25 through resistor 23. A negative temperature reference signal applied to summing junction 25 through adjustable resistor 41 has a value which represents the maximum allowable temperature of the turbine. Assume now that these two signals are the only signals applied to summing junction 25, this will cause operational amplifier 33 to go into positive saturation; and since control of the turbine is assumed by the circuit having the least positive output, the temperature control is ineffective at this time. As the turbine is started and flame is established, the temperature thereof will rise as is shown in FIG. 2, causing the temperature feedback signal first to become less negative and then gradually become increasingly more positive, until a point is reached where the reference signal and the feedback signals are equal and opposite. This condition arises when the turbine has reached its maximum allowable operating temperature.

However, if a third signal having a positive voltage is applied to the summing junction 25 in addition to the temperature feedback signal and in opposition to the negative temperature reference signal, the point where balance will occur represents a lower temperature, i.e., the maximum allowable temperature level is suppressed to a value which is determined by the positive voltage level of the third signal applied to the summing junction. The present invention provides a suppression signal which is variable between predetermined limits and adjusts its level to a value which is proportional to the temperature of the turbine during the warmup period and subsequently allows the turbine temperature to increase at a controlled rate to the maximum allowable temperature set by the temperature reference resistor 41.

Thus, at the time of startup, the turbine is cold and temperature feedback signal 21 is negative in polarity. With the temperature reference signal also negative, the amplifier 33 is in positive saturation and as in the previous example, the temperature control has no control over the turbine. The positive signal of the amplifier 33 is fed back through resistors 47, 39, and 37 to the negative bus 35. The resistors are selected to provide a voltage division circuit which causes transistor 29 to turn full on under these conditions, i.e., to conduct maximum. With transistor 29 full on, current flows from the positive bus 61 through resistor 51, diodes 49, 53, and 55, into the collector of the transistor 29 which when conducting in effect connects the base of transistor 31 directly to the common bus 27. In this arrangement transistor 31 is not conducting, thereby causing current to flow from the positive bus 61 through resistors 67 and 63 and through diode 65 into the summing junction 25, thus providing a suppression biasing signal thereto which has a maximum value. As the turbine temperature increases during the start-up period, the summing junction value changes due to a change in the temperature feedback signal, thereby changing the output of the amplifier which in turn changes the output of voltage divider and as a consequence thereof the input to the base of the transistor 29. As a result, transistor 29 tends to turn off, thereby causing transistor 31 to tend to conduct. With transistor 31 tending to conduct, a quantity of current, depending on the amount of conduction of transistor 31, will be diverted from the summing junction 25 through transistor 31 to the common bus 27, thereby changing the input signal to the operational amplifier 33, and the output thereof correspondingly. With the output of amplifier 33 changed, the feedback signal to the base of transistor 29 is changed, thereby causing a continual correction in the conduction of transistors 29 and 31, as a function of the temperature of the turbine. The operational amplifier 33 tends to be in positive saturation, but on verge of control of the turbine. The output thus follows the temperature rise of the turbine to the end of the warmup period. At the end of the warmup period, a timed signal causes a zero voltage to be applied to the input connection "Z," resulting in a zero voltage to be applied to the base of transistor 29 which then stops conducting. Current now flows through resistor 51 through diode 43 and input Z to the common bus 27 thus thereby diverting current from the base of transistor 31. However, transistor 31 remains in conducting state since current is still flowing through resistor 59 into the base. If capacitor 57 was not in the circuit, the base current through resistor 59 would be large enough to turn transistor 31 full on, thereby instantly diverting the positive current from summing junction 25. However, under the influence of capacitor 57 and the predetermined relationship of capacitance and resistance of resistor 59 transistor 31 gradually is caused to increase its conduction at a uniform rate. This causes current flowing through resistor 67 to be diverted from flowing to the summing junction to flowing through transistor 31 to common bus 27 until such time when the entire bias is removed and the input to the operational amplifier consists of the temperature reference and the temperature feedback.

What is claimed is:

1. In combination with a gas turbine having sensors for producing a feedback signal proportional to exhaust gas temperature, a temperature adaptive control, comprising:
   a. means for producing a voltage reference signal of a first polarity, said reference signal being proportional to a maximum allowable temperature of exhaust gases;
   b. means for producing a suppression voltage signal of a second polarity and having a value which initially varies indirectly with the temperature of the exhaust gases over a predetermined period of time;
   c. means for reducing the value of said suppression signal to zero at a predetermined rate subsequent to said predetermined period of time;
   d. a summing junction for algebraically adding said feedback signal, said reference signal and said suppression voltage signal to produce an output signal representing the sum;
   e. an operational amplifier connected to said summing junction for producing a signal proportional to fuel flow to the turbine in response to the output signal representing the algebraic sum of said feedback, reference and suppression signals;
   f. and means connecting the signal produced by the operational amplifier to the means for producing the suppression voltage signal to effect the variation of the last mentioned signal.

2. The invention claimed in claim 1 wherein during said predetermined period of time said suppression signal in combination with said reference signal represents a temperature which is greater than the actual temperature of the exhaust gases by a predetermined amount.

3. The invention of claim 2 wherein the difference between said temperatures is constant.

4. The invention claimed in claim 1 wherein said signal reducing means comprises a capacitor and resistance circuit.

5. The invention claimed in claim 1 wherein a switch provides the signal for reducing said suppression voltage signal to zero.

* * * * *

UNITED STATES PATENT OFFICE
CERTIFICATE OF CORRECTION

PATENT NO. : 3,667,218
DATED : June 6, 1972
INVENTOR(S) : Richard K. Davis

It is certified that error appears in the above-identified patent and that said Letters Patent are hereby corrected as shown below:

Column 1, line 22, after "perature" insert a period (.).
          line 33, cancel "actually" and substitute --adjustable--

Column 2, line 13, after "turbine" insert a period (.).
          line 29, cancel "ruining" and substitute --running--.
          line 30, cancel "pick" and substitute --pickup--.
          line 31, after "shaft" insert --, which--.

Column 3, line 59, insert a period (.) after "(Fig. 1)".

Column 4, line 30, after "positive" insert --output--.

Signed and Sealed this twenty-third Day of September 1975

[SEAL]

Attest:

RUTH C. MASON
Attesting Officer

C. MARSHALL DANN
Commissioner of Patents and Trademarks